(12) United States Patent
Otsuki et al.

(10) Patent No.: US 7,742,245 B2
(45) Date of Patent: Jun. 22, 2010

(54) LENS UNIT

(75) Inventors: Motohiko Otsuki, Miyagi-ken (JP); Yuichi Ida, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/542,454

(22) Filed: Aug. 17, 2009

(65) Prior Publication Data

US 2010/0053734 A1  Mar. 4, 2010

(30) Foreign Application Priority Data

Sep. 2, 2008  (JP) .............................. 2008-224851

(51) Int. Cl.
*G02B 9/00* (2006.01)
*G02B 7/02* (2006.01)

(52) U.S. Cl. ........................ 359/796; 359/740; 359/797; 359/819

(58) Field of Classification Search ................ 359/740, 359/796, 797, 819
See application file for complete search history.

(56) References Cited

U.S. PATENT DOCUMENTS

| | | | |
|---|---|---|---|
| 6,870,693 B2 * | 3/2005 | Ito | 359/819 |
| 6,954,311 B2 * | 10/2005 | Amanai | 359/819 |
| 7,221,524 B2 * | 5/2007 | Ye et al. | 359/819 |
| 7,230,777 B2 * | 6/2007 | Ye | 359/811 |
| 7,362,519 B2 * | 4/2008 | Sakaki | 359/811 |
| 7,639,438 B2 * | 12/2009 | Chen | 359/819 |
| 2006/0158750 A1 * | 7/2006 | Takahashi | 359/819 |
| 2007/0268601 A1 * | 11/2007 | Yu | 359/819 |
| 2008/0225414 A1 * | 9/2008 | Ozaki et al. | 359/822 |

FOREIGN PATENT DOCUMENTS

JP  2008-52196  3/2008

* cited by examiner

*Primary Examiner*—Evelyn A. Lester
(74) *Attorney, Agent, or Firm*—Beyer Law Group LLP

(57) ABSTRACT

A lens unit includes at least three lenses that are laminated and received in a lens barrel. The lenses include a first lens, a second lens, and a third lens that are laminated from the side of an object in this order. The first lens includes a first contact face that is formed at an outer peripheral portion thereof and comes in contact with the second lens, and a first opposite surface that is formed at an inner peripheral portion of the first contact face, is spaced from the second lens, and faces the second lens. The second lens includes a second contact face that is formed at a position closer to the center of the second lens than the first contact face and comes in contact with the third lens, and a second opposite surface that is formed at an outer peripheral portion of the second contact face, is spaced from the third lens, and faces the third lens.

5 Claims, 5 Drawing Sheets

FIG. 8

| HEIGHT (cm) | | 10 | 20 | 30 | 40 | 50 |
|---|---|---|---|---|---|---|
| TYPE1 | 1 | ○ | ○ | ○ | ○ | × |
| | 2 | ○ | ○ | ○ | × | |
| | 3 | ○ | ○ | ○ | × | |
| TYPE2 | 1 | ○ | ○ | × | | |
| | 2 | ○ | × | | | |
| TYPE3 | 1 | ○ | ○ | ○ | × | |
| | 2 | ○ | ○ | ○ | × | |
| | 3 | ○ | ○ | × | | |
| TYPE4 | 1 | ○ | ○ | × | | |
| | 2 | ○ | ○ | × | | |

LENS UNIT

CROSS REFERENCE TO RELATED APPLICATION

The present invention claims the benefit under 35 U.S.C. Section 119 of Japanese Patent Application No. 2008-224851 filed in the Japanese Patent Office on Sep. 2, 2008, the entire contents of which is incorporated herein by reference.

BACKGROUND

1. Technical Field

The present invention relates to a lens unit where at least three lenses are laminated and received in a lens barrel, and more particularly, to a lens unit that is resistant to an impact applied from an object.

2. Related Art

In the past, there has been known a lens unit where a plurality of lenses is received in a cylindrical lens barrel so as to be laminated. The lens unit has been used not only for camera modules of a digital camera, a mobile phone with a camera, and the like, but also for an in-vehicle camera that is used to monitor the rear side of an automobile. There is, for example, a lens unit disclosed in Japanese Unexamined Patent Application Publication No. 2008-52196 as a lens unit where a plurality of lenses is laminated in a lens barrel as described above.

When a lens unit is used for an in-vehicle camera, there is a supposed case where an impact is applied to a lens by a flying stone, or the like. Accordingly, it is necessary for an in-vehicle camera not to be damaged when a certain impact is applied to a lens unit. In a lens unit in the related art, lenses merely come in contact with each other at peripheral portions. For this reason, when an impact is applied to the lenses, the impact is directly transmitted between the lenses. Therefore, there has been a problem in that the lenses are apt to become damaged.

SUMMARY

An advantage of some aspects of the invention is to provide a lens unit that softens an impact and is hardly damaged even though the impact is applied to lenses.

According to an aspect of the invention, there is provided a lens unit including at least three lenses that are laminated and received in a lens barrel. The lenses include a first lens, a second lens, and a third lens that are laminated from the side of an object in this order. The first lens includes a first contact face that is formed at an outer peripheral portion thereof and comes in contact with the second lens, and a first opposite surface that is formed at an inner peripheral portion of the first contact face, is spaced from the second lens, and faces the second lens. The second lens includes a second contact face that is formed at a position closer to the center of the second lens than the first contact face and comes in contact with the third lens, and a second opposite surface that is formed at an outer peripheral portion of the second contact face, is spaced from the third lens, and faces the third lens.

Further, in the lens unit according to the aspect of the invention, the second lens may include a flange portion that is formed at the peripheral portion thereof. The flange portion may come in contact with the first contact face of the first lens. The second contact face and the second opposite surface may be formed at a portion of the second lens that is closer to the center of the second lens than the flange portion.

Furthermore, in the lens unit according to the aspect of the invention, the lens barrel may include a step, which is spaced from and faces the flange portion in a lamination direction of the lenses, on an inner peripheral surface thereof.

In addition, in the lens unit according to the aspect of the invention, a fourth lens coming in contact with the third lens may be received in the lens barrel. The third lens may include a third contact face that is formed at a position closer to the periphery of the third lens than the second contact face and comes in contact with the fourth lens, and a third opposite surface that is formed at an inner peripheral portion of the third contact face, is spaced from the fourth lens, and faces the fourth lens.

Further, in the lens unit according to the aspect of the invention, the lens barrel may include a lens receiving face that comes in contact with a surface of the fourth lens opposite to a surface of the fourth lens coming in contact with the third lens. The fourth lens may include a fourth contact face that is formed at a position closer to the center of the fourth lens than the third contact face and comes in contact with the lens receiving face, and a fourth opposite surface that is formed at an outer peripheral portion of the fourth contact face, is spaced from the lens receiving face, and faces the lens receiving face.

According to the lens unit of the aspect of the invention, the lenses include a first lens, a second lens, and a third lens that are laminated from the side of an object in this order. The first lens includes a first contact face that is formed at an outer peripheral portion thereof and comes in contact with the second lens, and a first opposite surface that is formed at an inner peripheral portion of the first contact face, is spaced from the second lens, and faces the second lens. The second lens includes a second contact face that is formed at a position closer to the center of the second lens than the first contact face and comes in contact with the third lens, and a second opposite surface that is formed at an outer peripheral portion of the second contact face, is spaced from the third lens, and faces the third lens. Accordingly, when an impact force is applied to the first lens, the outer peripheral portion of the second lens may be bent downward and the lens unit may soften the impact force. Therefore, it may be possible to suppress the damage of the lens unit that is caused by the impact.

Further, according to the lens unit of the aspect of the invention, the second lens includes a flange portion that is formed at the peripheral portion thereof, the flange portion comes in contact with the first contact face of the first lens, and the second contact face and the second opposite surface are formed at a portion of the second lens that is closer to the center of the second lens than the flange portion. Accordingly, the flange portion is deformed, so that it may be possible to further soften an impact and to suppress the damage of the lens unit caused by the impact.

Furthermore, according to the lens unit of the aspect of the invention, the lens barrel includes a step, which is spaced from and faces the flange portion in a lamination direction of the lenses, on an inner peripheral surface thereof. Accordingly, even though a force is applied to the flange portion, the flange portion is reliably deformed because the flange portion is spaced from the step. Therefore, it may be possible to soften an impact.

In addition, according to the lens unit of the aspect of the invention, the third lens includes a third contact face that is formed at a position closer to the periphery of the third lens than the second contact face and comes in contact with the fourth lens, and a third opposite surface that is formed at an inner peripheral portion of the third contact face, is spaced from the fourth lens, and faces the fourth lens. Accordingly, the peripheral portion of the third lens may also be deformed, so that it may be possible to further soften an impact and to suppress the damage of the lens unit.

Further, according to the lens unit of the aspect of the invention, the lens barrel includes a lens receiving face that comes in contact with a surface of the fourth lens opposite to a surface of the fourth lens coming in contact with the third lens, and the fourth lens includes a fourth contact face that is formed at a position closer to the center of the fourth lens than the third contact face and comes in contact with the lens receiving face, and a fourth opposite surface that is formed at an outer peripheral portion of the fourth contact face, is spaced from the lens receiving face, and faces the lens receiving face. Accordingly, the peripheral portion of the fourth lens may also be deformed, so that it may be possible to further soften an impact and to suppress the damage of the lens unit.

BRIEF DESCRIPTION OF THE DRAWINGS

FIG. 8 is a table showing the results of actual falling ball tests.

DESCRIPTION OF EXEMPLARY EMBODIMENTS

Figure 1:
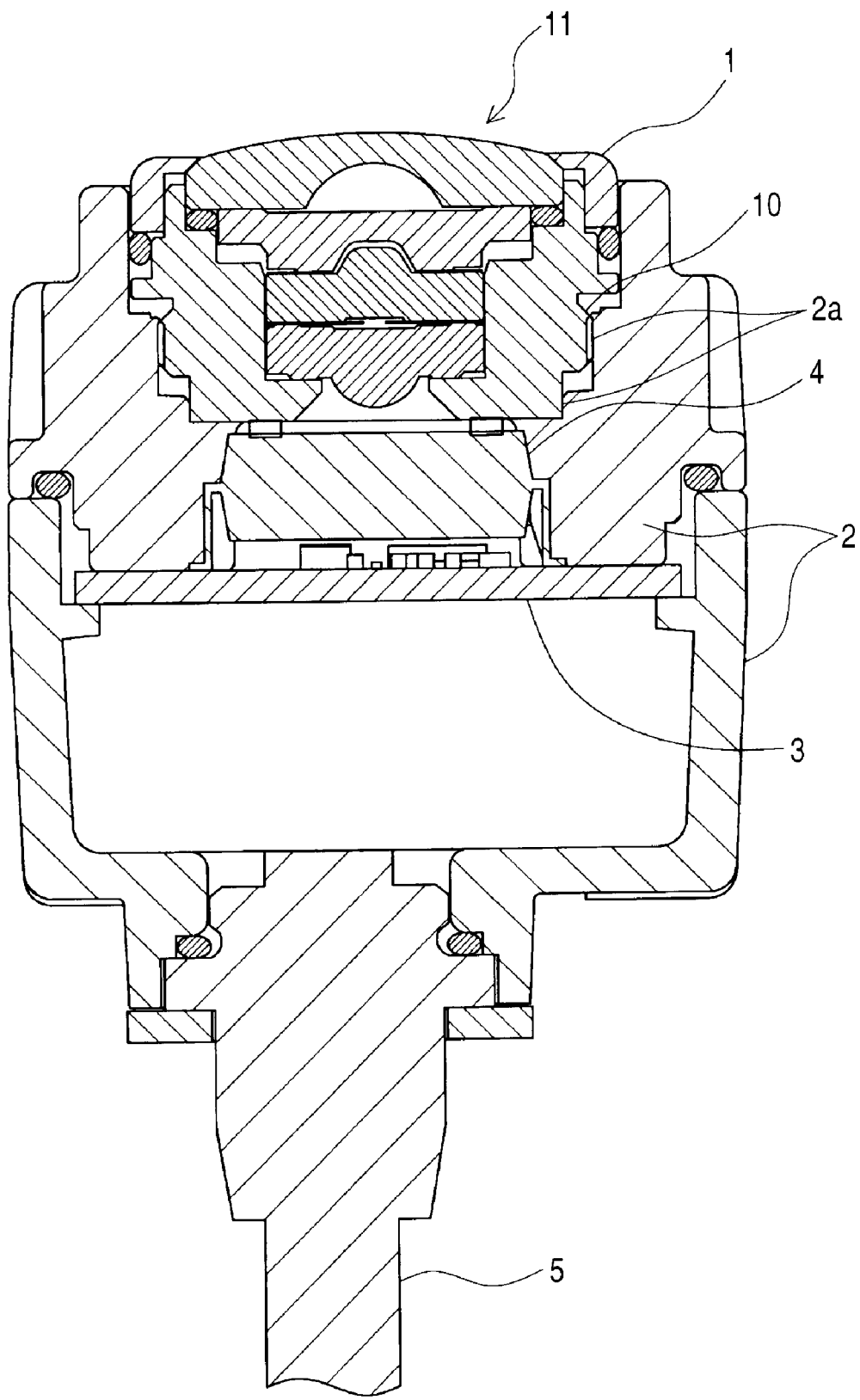
FIG. 1 is a cross-sectional view of an in-vehicle camera that includes a lens unit according to an embodiment of the invention.

An embodiment of the invention will be described in detail below with reference to the drawings. FIG. 1 is a cross-sectional view of an in-vehicle camera that includes a lens unit according to an embodiment of the invention. As shown in FIG. 1, the in-vehicle camera includes a lens unit 1 that focuses light and is received in a case-like housing 2 so as to be exposed to the outside, a light-receiving section 4 that receives the light from the lens unit 1 and converts the light into an electrical signal, and a transmission cable 5 that transmits the data of an image obtained by the light-receiving section 4.

The lens unit 1 includes lenses 11 that are received in a cylindrical lens barrel 10 so as to be laminated. A lens barrel holding portion 2a of which one end forms an opening is formed at the housing 2. The outer peripheral surface of the lens barrel 10 is fixed so as to come in contact with the inner peripheral surface of the lens barrel holding portion, so that the lens unit 1 is mounted on the housing 2. In this state, among the lenses 11 laminated in the lens barrel 10, a lens closest to an object, that is, the outermost lens 11 is disposed so as to protrude from the housing 2. Further, the lenses 11, which are composed of a plurality of lens groups, are formed so as to take an image with a wide angle.

Furthermore, a substrate 3 on which a light-receiving section 4 is mounted is provided in the housing 2. Accordingly, electronic components, which transmit electrical signals acquired by the light-receiving section 4 to the transmission cable 5 as image signals, and the like are provided in the housing. Since being not related to the invention, the details thereof will be omitted.

Figure 2:
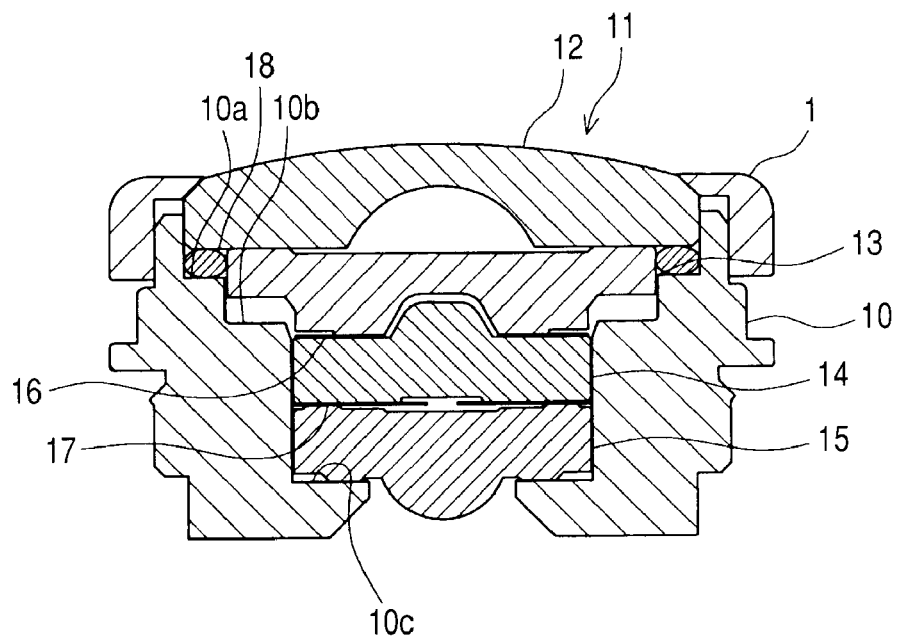
FIG. 2 is a cross-sectional view of the lens unit.

FIG. 2 is a cross-sectional view of the lens unit 1. The lens unit 1 includes the lenses 11 that are received in the lens barrel 10 so as to be laminated as described above. As the lenses 11, a first lens 12, a second lens 13, a third lens 14, and a fourth lens 15 are provided from the side of an object in this order. Among the lenses, the first lens 12 has the largest outer diameter. The outer diameter of the second lens 13 is smaller than that of the first lens 12. Further, the outer diameter of the third lens 14 is smaller than that of the second lens 13, and the outer diameter of the fourth lens 15 is equal to that of the third lens 14.

The lens barrel 10 has the largest inner diameter at a portion thereof where the first lens 12 is received. A first step 10a, which faces the lamination direction of the lenses 11, is formed at a portion of the lens barrel where the second lens 13 is received, so that the lens barrel has an inner diameter corresponding to the outer diameter of the second lens 13. In addition, a second step 10b, which faces to the lamination direction of the lenses 11, is formed at the lens barrel near the lower end of the second lens 13, so that a portion of the lens barrel below the second step has an inner diameter corresponding to the outer diameters of the third and fourth lenses 14 and 15.

A lens receiving face 10c, which protrudes inward from the inner peripheral surface of the lens barrel, is formed at the end of the lens barrel 10 below the fourth lens 15. The fourth lens 15 is placed on the lens receiving face 10c, and the lenses are laminated while the lens receiving face is used as a datum plane.

A thin plate-like first diaphragm plate 16 is interposed between the second and third lenses 13 and 14. The first diaphragm plate 16 includes a hole at the central portion thereof so as to transmit light, and does not transmit light at the peripheral portion thereof. Further, a thin plate-like second diaphragm plate 17 is also interposed between the third and fourth lenses 14 and 15. Like the first diaphragm plate 16, the second diaphragm plate transmits light at the central portion thereof and does not transmit light at the peripheral portion thereof.

Figure 3:
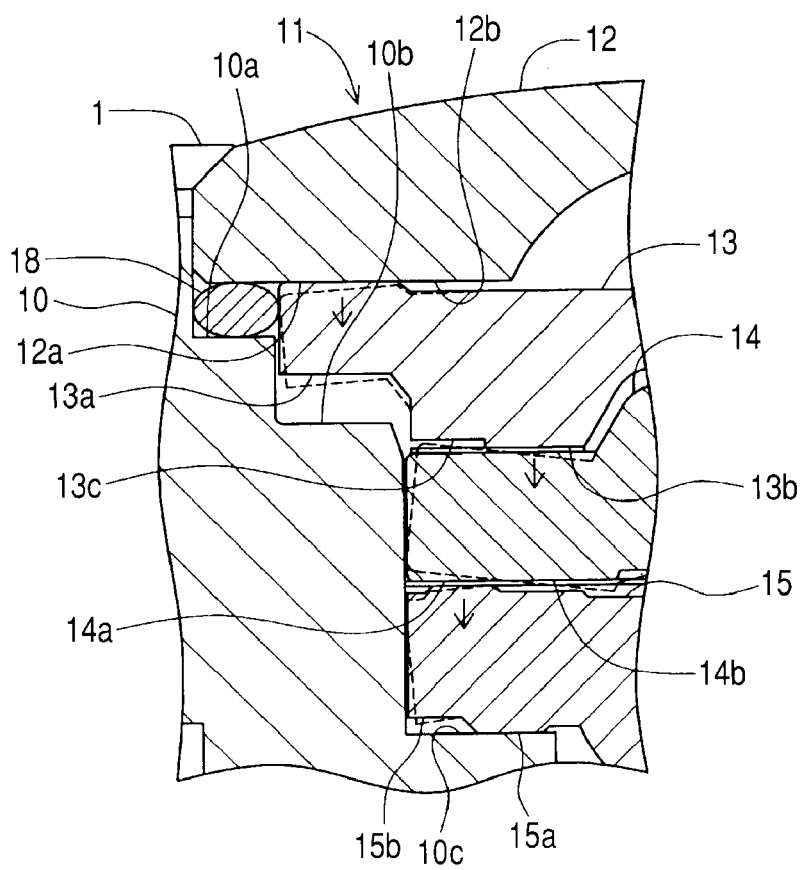
FIG. 3 is an enlarged view of one of the side portions of lenses shown in FIG. 2.

The laminated structure of the lenses 11 will be described in more detail. FIG. 3 is an enlarged view of one of the side portions of the lenses 11 shown in FIG. 2. The lower surface of the peripheral portion of the first lens 12 is formed without any unevenness. The lower surface of the outermost peripheral portion of the first lens is spaced from the first step 10a, and an O-ring 18 is received in a gap between the lower surface of the outermost peripheral portion of the first lens and the first step. The first lens 12 includes a first contact face 12a, which comes in contact with the upper surface of the outermost peripheral portion of the second lens 13, at a position that is closer to the center thereof than the outermost peripheral portion. The second lens 13 includes a flange portion 13a that protrudes outward from the peripheral portion of the second lens in the shape of a flange, and the first contact face 12a of the first lens 12 is placed on the upper surface of the flange portion 13a.

A portion of the second lens 13, which is closer to the center thereof the second lens than the flange portion 13a, is formed in the shape of a recess so as to have a difference in the level. Accordingly, a portion of the first lens 12, which is closer to the center of the first lens than the first contact face 12a, forms a first opposite surface 12b that is spaced from the second lens 13 and faces the second lens. Further, the flange portion 13a of the second lens 13 is spaced from the second step 10b of the lens barrel 10 so as to have a gap therebetween. For this reason, when an impact is applied to the first lens 12, the contact face 12a of the first lens 12 presses the flange portion 13a that forms the outermost peripheral portion of the second lens 13 and the flange portion 13a may be deformed to be bent downward as shown by a dotted line of FIG. 3 since a space is formed below the flange portion.

The second lens 13 includes a second contact face 13b, which comes in contact with the third lens 14, on the lower surface thereof at a position that is closer to the center of the second lens than the flange portion 13a, that is, a position that is closer to the center than the first contact face 12a. A portion of the second lens, which is closer to the periphery of the second lens than the second contact face 13b, forms a second opposite surface 13c that is spaced from the third lens 14 so as to have a difference in the level and a gap between the second opposite surface and the third lens.

The upper and lower surfaces of the peripheral portion of the third lens 14 are formed to be flat. The lower surface of the outermost peripheral portion of the third lens 14 forms a third contact face 14a that comes in contact with the upper surface of the fourth lens 15. A portion of the upper surface of the fourth lens 15, which is closer to the center of the fourth lens than a portion of the fourth lens coming in contact with the third contact face 14a of the third lens 14, is formed in the shape of a recess so as to have a difference in the level. Accordingly, a portion of the third lens 14, which is closer to the center of the third lens than the third contact face 14a, forms a third opposite surface 14b that is spaced from the fourth lens 15 and faces the fourth lens.

As described above, the peripheral portion of the third lens 14 is pressed against the second contact face 13a of the second lens 13 at a position that is close to the center, and comes in contact with the fourth lens 15 by the third contact face 14a that is formed at a portion closer to the periphery than the second contact face 13a. Accordingly, when the second lens 13 to which a force is applied from the first lens 12 presses the third lens 14, the peripheral portion of the third lens 14 may be deformed to be bent upward as shown by a dotted line of FIG. 3.

A portion of the lower surface of the fourth lens 15, which is closer to the center of the third lens 14 than the third contact face 14a, is formed in the shape of a protrusion so as to have a difference in the level. The portion of the lower surface of the fourth lens forms a fourth contact face 15a that comes in contact with the lens receiving face 10c of the lens barrel 10. A portion of the fourth lens, which is closer to the periphery of the fourth lens than the fourth contact face 15a, forms a fourth opposite surface 15b that is spaced from the lens receiving face 10c so as to have a gap between the fourth opposite surface and the lens receiving face. Accordingly, when the third lens 14, to which a force is applied from the second lens 13, presses the fourth lens 15, the peripheral portion of the fourth lens 15 may be deformed to be bent downward as shown by a dotted line of FIG. 3.

As described above, the first lens 12 comes in contact with only the outermost peripheral portion of the second lens 13, and the lenses are laminated so that the contact faces are not aligned with each other in a vertical direction. Accordingly, when an impact is applied to the first lens 12, the respective lenses transmit a force to the lower side while being bent. As a result, the impact may be softened so that the lenses are hardly damaged.

Figure 4:
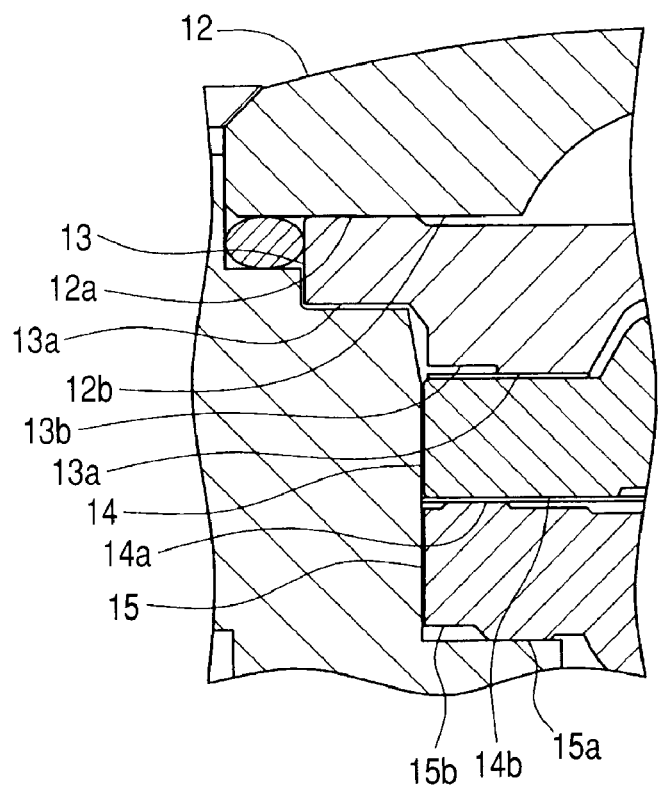
FIG. 4 is an enlarged cross-sectional view of a second type lens unit.

Analysis results and experimental results, when an impact force is applied to four kinds of lens units including the lens unit 1 according to this embodiment, will be described. Herein, the lens unit 1 according to this embodiment is prepared as a first type lens unit and second to fourth type lens units are prepared in addition to the first type lens unit. FIG. 4 is an enlarged cross-sectional view of a second type lens unit. The second type lens unit is different from the first type lens unit only in the shape of a second lens 13. Specifically, the flange portion 13a is formed to be thick so that the lower surface of the flange portion 13a of the second lens 13 approaches the second step 10b of the lens barrel 10 in comparison with the first type lens unit.

Figure 5:
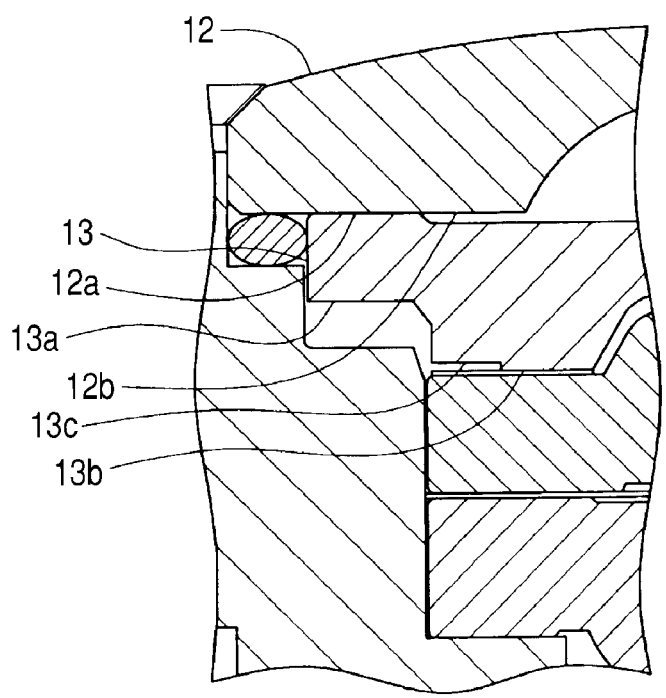
FIG. 5 is an enlarged cross-sectional view of a third type lens unit.
Figure 6:
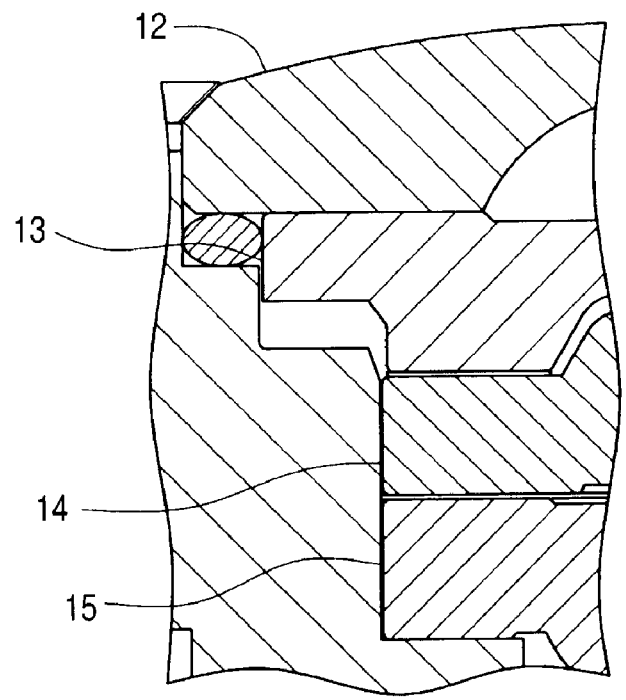
FIG. 6 is an enlarged cross-sectional view of a fourth type lens unit.

FIG. 5 is an enlarged cross-sectional view of a third type lens unit. The third type lens unit is different from the first type lens unit only in the shape of a fourth lens 15. Specifically, the upper and lower surfaces of the peripheral portion of the fourth lens 15 are formed to be flat. Accordingly, the peripheral portions of the third and fourth lenses 14 and 15 are not bent unlike the first type lens unit. FIG. 6 is an enlarged cross-sectional view of a fourth type lens unit. Since the laminated surface of each of the lenses of the fourth type lens unit is formed to be flat, the structure of the fourth type lens unit is the same as that of a lens unit in the related art.

Figure 7:
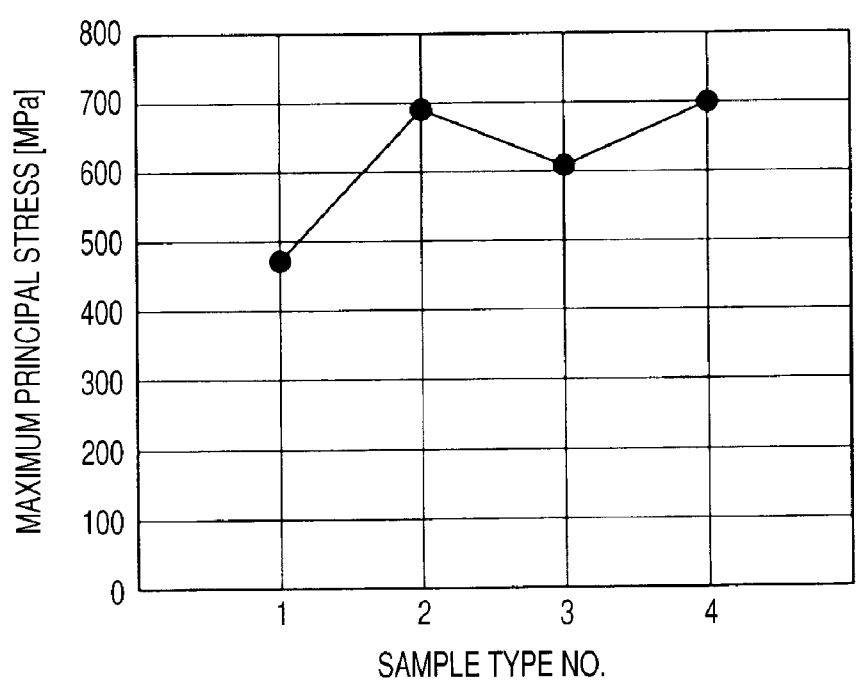
FIG. 7 is a graph showing the analysis results of hypothetical falling ball tests for the respective type lens units.

FIG. 7 is a graph showing the analysis results of the hypothetical falling ball tests for the respective type lens units. Herein, the respective type lens units are placed on plastic tiles, and there is a hypothetical falling ball test where an iron ball having a weight of 50 g falls on each first lens 12 from the height of 20 cm. A value of the maximum principal stress, which is generated in the lens 11 in this case, is obtained by numerical analysis. Meanwhile, the first lens 12 is made of glass, and the maximum principal stress is generated at the top of the first lens 12. As a result, as shown in FIG. 7, it was found out that the first type lens unit had the smallest value of maximum principal stress, the third type lens unit had the next smallest value of maximum principal stress, and the second and fourth type lens units had the same value of maximum principal stress that was infact the largest value.

FIG. 8 is a table showing the results of actual falling ball tests. Herein, like in the case of the analysis, the respective type lens units were placed on plastic tiles and a test where an iron ball having a weight of 50 g fell on each first lens was performed. Meanwhile, the first lens 12 is made of glass. The height of a falling iron ball is used as a parameter. O is given when the lens 11 is not damaged, and X is given when the lens 11 is damaged.

As shown in FIG. 8, it was confirmed that the first type lens unit was not damaged even though a falling ball fell on the lens from the height of 30 cm in three tests. Meanwhile, in some cases the second type lens unit was damaged by a falling ball falling from the height of 20 cm. The third and fourth type lens units were damaged in some cases by a falling ball falling from the height of 30 cm. These test results substantially correspond to the analysis results shown in FIG. 7.

In the second type lens unit shown in FIG. 4, like in the first type lens unit, the lenses have come in contact with each other and been laminated so as not to be aligned with each other in a vertical direction. However, since a gap between the lower surface of the flange portion 13a of the second lens 13 and the second step 10b of the lens barrel 10 is small, the lower surface of the flange portion 13a of the second lens 13 comes in contact with the lens barrel 10 when a force is transmitted to the second lens 13 from the first lens 12. For this reason, it is considered that the flange portion of the second lens is not deformed any more and the value of the maximum principal stress is rather increased.

The third type lens unit where only the second lens 13 is deformable softens an impact force, not as much as the first type lens unit, in comparison with the fourth type lens unit that corresponds to the lens unit in the related art.

As described above, the first lens 12 comes in contact with only the outermost peripheral portion of the second lens 13 at the first contact face 12a, the second lens 13 comes in contact with the third lens 14 at the second contact face 13a that is closer to the center than the first contact face 12a, and at least the outer peripheral portion of the second lens 13 may be deformed by a force applied from the first lens 12. Accordingly, the lens unit according to this embodiment may soften an impact force and be hardly damaged in comparison with the lens unit in the related art.

Further, since the third lens 14 and the fourth lens are laminated so that the contact portions are not aligned with each other in a vertical direction, the lens unit according to this embodiment may soften an impact force and be hardly damaged. However, sufficiently large gaps need to be formed between the lenses and the steps of the lens barrel 10 so that the respective lenses do not come in contact with the steps of the lens barrel 10 when being bent.

The embodiment of the invention has been described above. However, the invention is not limited to the above-mentioned embodiment and may have various modifications within the scope of the invention. For example, the lenses 11 received in the lens barrel 10 may have any optical characteristics, and the number of the lenses may be three or more.

It should be understood by those skilled in the art that various modifications, combinations, sub-combinations and alterations may occur depending on design requirements and other factors insofar as they are within the scope of the appended claims of the equivalents thereof.

What is claimed is:

1. A lens unit comprising:

at least three lenses that are laminated and received in a lens barrel, wherein the lenses include a first lens, a second lens, and a third lens that are laminated from the side of an object in this order, the first lens includes a first contact face that is formed at an outer peripheral portion of the first lens and comes in contact with the second lens, and a first opposite surface that is formed at an inner peripheral portion of the first contact face, is spaced from the second lens, and faces the second lens, and the second lens includes a second contact face that is formed at a position closer to the center of the second lens than the first contact face and comes in contact with the third lens, and a second opposite surface that is formed at an outer peripheral portion of the second contact face, is spaced from the third lens, and faces the third lens.

2. The lens unit according to claim 1, wherein the second lens includes a flange portion that is formed at the peripheral portion thereof, the flange portion comes in contact with the first contact face of the first lens, and the second contact face and the second opposite surface are formed at a portion of the second lens that is closer to the center of the second lens than the flange portion.

3. The lens unit according to claim 2, wherein the lens barrel includes a step, which is spaced from and faces the flange portion in a lamination direction of the lenses, on an inner peripheral surface thereof.

4. The lens unit according to claim 1, wherein a fourth lens coming in contact with the third lens is received in the lens barrel, and the third lens includes a third contact face that is formed at a position closer to the periphery of the third lens than the second contact face and comes in contact with the fourth lens, and a third opposite surface that is formed at an inner peripheral portion of the third contact face, is spaced from the fourth lens, and faces the fourth lens.

5. The lens unit according to claim 4, wherein the lens barrel includes a lens receiving face that comes in contact with a surface of the fourth lens opposite to a surface of the fourth lens coming in contact with the third lens, and the fourth lens includes a fourth contact face that is formed at a position closer to the center of the fourth lens than the third contact face and comes in contact with the lens receiving face, and a fourth opposite surface that is formed at an outer peripheral portion of the fourth contact face, is spaced from the lens receiving face, and faces the lens receiving face.

* * * * *